(12) United States Patent
Pan et al.

(10) Patent No.: US 12,556,329 B2
(45) Date of Patent: Feb. 17, 2026

(54) SYSTEMS AND METHODS FOR INDICATING UPLINK POSITIONING INFORMATION IN WIRELESS COMMUNICATION SYSTEMS

(71) Applicant: ZTE CORPORATION, Guangdong (CN)

(72) Inventors: Yu Pan, Shenzhen (CN); Guozeng Zheng, Shenzhen (CN); Chuangxin Jiang, Shenzhen (CN); Zhaohua Lu, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 286 days.

(21) Appl. No.: 18/491,504

(22) Filed: Oct. 20, 2023

(65) Prior Publication Data
US 2024/0187169 A1  Jun. 6, 2024

Related U.S. Application Data

(63) Continuation of application No. PCT/CN2021/093041, filed on May 11, 2021.

(51) Int. Cl.
*H04L 5/00* (2006.01)
*H04B 7/06* (2006.01)

(52) U.S. Cl.
CPC ......... *H04L 5/0048* (2013.01); *H04B 7/0608* (2013.01)

(58) Field of Classification Search
None
See application file for complete search history.

(56) References Cited

U.S. PATENT DOCUMENTS

| | | | |
|---|---|---|---|
| 2015/0215887 A1 | 7/2015 | Nejatian et al. | |
| 2015/0257121 A1 | 9/2015 | Siomina et al. | |
| 2022/0357420 A1* | 11/2022 | Zhou | H04W 56/0055 |

(Continued)

FOREIGN PATENT DOCUMENTS

| | | |
|---|---|---|
| CN | 111630805 A | 9/2020 |
| WO | WO-2020/197357 A1 | 10/2020 |

OTHER PUBLICATIONS

CATT (Moderator), "FLSummary for accuracy improvements by mitigating UE Rx/Tx and/or gNB Rx/Tx timing delays" 3GPP TSG RAN WG1 Meeting #104bis-e, R1-2103781, Apr. 20, 2021, e-Meeting (40 pages).

(Continued)

*Primary Examiner* — Diane L Lo
(74) *Attorney, Agent, or Firm* — Foley & Lardner LLP

(57) ABSTRACT

Systems and methods for indicating positioning information in wireless communication systems are disclosed. In one aspect, the method includes determining, by a wireless communication device, transmission Timing Error Group (TEG) information of the wireless communication device according to at least one of usage of Sounding Reference Signal (SRS) transmission, UE antenna coherent capability, UE antenna switching capability, or SRS port. The transmission TEG information includes at least one of a number of transmission TEGs, an association between the transmission TEGs and SRS transmission. The SRS transmission includes at least one of a SRS resource set, a SRS resource, or a SRS port. The method also includes communicating, by the wireless communication device with a network, using the transmission TEG information.

19 Claims, 12 Drawing Sheets

(56) References Cited

U.S. PATENT DOCUMENTS

2022/0390548 A1* 12/2022 Zhou ................. G01S 11/06
2024/0155550 A1* 5/2024 Dai ................. G01S 13/765

OTHER PUBLICATIONS

CATT, "[Draft] Ls on UE/TRP Tx/Rx Timing Errors" 3GPP TSG RAN WG1 Meeting #104bis-e, R1- 2104053, Apr. 20, 2021, e-meeting (2 pages).
International Search Report and Written Opinion for PCT Appl. No. PCT/CN2021/093041, mailed Jan. 25, 2022 (8 pages).

\* cited by examiner

700

```
┌─────────────────────────────────────────────────────┐
│ Determine transmission TEG information (including at least one of │
│ a number of transmission TEGs, an association between the        │
│ transmission TEGs and SRS transmission) of the wireless          │──702
│ communication device according to at least one of usage of SRS   │
│ transmission, UE antenna coherent capability, UE antenna         │
│ switching capability, or SRS port                                │
└─────────────────────────────────────────────────────┘
                            │
                            ▼
┌─────────────────────────────────────────────────────┐
│ Report UE capability including an indication of whether the UE   │
│ supports a SRS resource configured for performing configured     │──704
│ usage and for determining UE Rx-Tx time difference measurement   │
└─────────────────────────────────────────────────────┘
                            │
                            ▼
┌─────────────────────────────────────────────────────┐
│ Communicate using the transmission TEG information               │──706
└─────────────────────────────────────────────────────┘
```

┌─────────────────────────────────────────────────────────┐
│ Determine transmission TEG information (including at least one of │
│ a number of transmission TEGs, an association between the │
│ transmission TEGs and SRS transmission) of the wireless │ 802
│ communication device according to at least one of usage of SRS │
│ transmission, UE antenna coherent capability, UE antenna │
│ switching capability, or SRS port │
└─────────────────────────────────────────────────────────┘
                              ↓
┌─────────────────────────────────────────────────────────┐
│ Report UE capability including an indication of whether a pair of │ 804
│ reception TEG and transmission TEG is assumed as a combination │
└─────────────────────────────────────────────────────────┘
                              ↓
┌─────────────────────────────────────────────────────────┐
│ Communicate using the transmission TEG information │ 806
└─────────────────────────────────────────────────────────┘

Determine transmission TEG information (including at least one of a number of transmission TEGs, an association between the transmission TEGs, and SRS transmission) of a wireless communication device according to at least one of usage of SRS transmission, UE antenna coherent capability, UE antenna switching capability, or SRS port — 1002

Communicate using the transmission TEG information — 1004

Determine transmission TEG information (including at least one of a number of transmission TEGs, an association between the transmission TEGs, and SRS transmission) of a wireless communication device according to at least one of usage of SRS transmission, UE antenna coherent capability, UE antenna switching capability, or SRS port — 1202

Receive UE capability including at least one of: (1) an indication of whether the wireless communication device supports a SRS resource configured for performing configured usage and for determining UE Rx-Tx time difference measurement; (2) an indication of whether a pair of reception TEG and transmission TEG is assumed as a combination; and (3) at least one pair of reception TEG and transmission TEG that can be assumed as a combination — 1204

Communicate using the transmission TEG information — 1206

Determine transmission TEG information (including at least one of a number of transmission TEGs, an association between the transmission TEGs and SRS transmission) of the wireless communication device according to at least one of usage of SRS transmission, UE antenna coherent capability, UE antenna switching capability, or SRS port — 1302

Determine that the transmission TEG information is associated with at least one SRS resource or at least one SRS port, based on UE antenna switching capability — 1304

Communicate using the transmission TEG information — 1306

FIG. 13

SYSTEMS AND METHODS FOR INDICATING UPLINK POSITIONING INFORMATION IN WIRELESS COMMUNICATION SYSTEMS

CROSS-REFERENCE TO RELATED APPLICATION

This application claims the benefit of priority under 35 U.S.C. § 120 as a continuation of PCT Patent Application No. PCT/CN2021/093041, filed on May 11, 2021, the disclosure of which is incorporated herein by reference in its entirety.

TECHNICAL FIELD

The disclosure relates generally to wireless communication, including but not limited to systems and methods for obtaining uplink positioning information in wireless communication systems.

BACKGROUND

The standardization organization Third Generation Partnership Project (3GPP) is currently in the process of specifying a new Radio Interface called 5G New Radio (5G NR) as well as a Next Generation Packet Core Network (NG-CN or NGC). The 5G NR will have three main components: a 5G Access Network (5G-AN), a 5G Core Network (5GC), and a User Equipment (UE). In order to facilitate the enablement of different data services and requirements, the elements of the 5GC, also called Network Functions (NFs), have been simplified with some of them being software based so that they could be adapted according to need.

SUMMARY

One embodiment of the invention relates to a wireless communication method, including: determining, by a wireless communication device, transmission Timing Error Group (TEG) information of the wireless communication device according to at least one of usage of Sounding Reference Signal (SRS) transmission, UE antenna coherent capability, UE antenna switching capability, or SRS port. The transmission TEG information includes at least one of a number of transmission TEGs, an association between the transmission TEGs and SRS transmission. The SRS transmission includes at least one of a SRS resource set, a SRS resource, or a SRS port. The method also includes communicating, by the wireless communication device with a network, using the transmission TEG information.

In some embodiments, the method further includes receiving, by the wireless communication device from the network, configuration of the SRS transmission, the configuration of SRS transmission includes the transmission TEG information.

In some embodiments, the method further includes sending, by the wireless communication device to the network, the UE capability. The UE capability includes the transmission TEG information.

In some embodiments, the usage of the SRS transmission corresponds to the SRS transmission being configured with codebook usage, and the transmission TEG information is associated with at least one SRS port.

In some embodiments, the UE antenna coherent capability is non-coherent, and a number of transmission TEGs supported by the wireless communication device is at most a first number. In some embodiments, the UE antenna coherent capability is partial-coherent, and the number of transmission TEGs supported by the wireless communication device is at most a second number. In some embodiments, the UE antenna coherent capability is full-coherent, and the number of transmission TEGs supported by the wireless communication device is at most a third number. In some embodiments, the number of transmission TEGs supported by the wireless communication device is the fourth number, an association between the SRS ports and the transmission TEGs being predefined.

In some embodiments, the usage of the SRS transmission corresponds to the SRS transmission being configured with non-codebook usage. The transmission TEG information is associated with at least one SRS port, or one SRS resource.

In some embodiments, the usage of the SRS transmission corresponds to the SRS transmission being configured with beam management. The transmission TEG information is associated with at least one SRS port, or one SRS resource, or one SRS resource set.

In some embodiments, the usage of the SRS transmission corresponds to the SRS transmission being configured with antenna switching. In some embodiments, the above method further includes determining, by the wireless communication device, that the transmission TEG information is associated with at least one SRS resource or at least one SRS port, based on UE antenna switching capability.

In some embodiments, the UE antenna switching capability corresponds to one of 1T1R, 1T2R, 1T4R, 1T6R, or 1T8R, and the transmission TEG information is associated with the at least one SRS resource. In some embodiments, the UE antenna switching capability corresponds to 2T2R, or 4T4R, and the transmission TEG information is associated with the at least one SRS port. In some embodiments, the UE antenna switching capability corresponds to one of 2T4R, 2T6R, 2T8R, or 4T8R, and the transmission TEG information is associated with the at least one SRS resource or the at least one SRS port.

In some embodiments, the method further includes reporting, by the wireless communication device to the network, UE capability. The UE capability includes an indication of whether the wireless communication device supports a SRS resource configured for performing configured usage and for determining UE Rx-Tx time difference measurement.

In some embodiments, a SRS resource is configured with a label indicating whether the SRS resource is capable of being used for the configured usage and for determining the UE Rx-Tx time difference measurement in positioning.

In some embodiments, the method further includes reporting, by the wireless communication device to the network, UE capability, wherein the UE capability includes an indication of whether a pair of reception TEG and transmission TEG is assumed as a combination.

In some embodiments, the method further includes reporting, by the wireless communication device to the network, UE capability, wherein the UE capability includes at least one pair of reception TEG and transmission TEG that can be assumed as a combination.

Another embodiment relates to a wireless communication apparatus including at least one processor and a memory, wherein the at least one processor is configured to read code from the memory and implement the above method.

Another embodiment relates to a computer program product including a computer-readable program medium code stored thereupon, the code, when executed by at least one processor, causing the at least one processor to implement the above method.

Another embodiment includes a wireless communication method, including determining, by a network, transmission TEG information of a wireless communication device, the transmission TEG information is determined based on at least one of usage of SRS transmission, User Equipment (UE) antenna coherent capability, UE antenna switching capability, or SRS port. The transmission TEG information includes at least one of a number of transmission TEGs, an association between the transmission TEGs and SRS transmission. The SRS transmission includes at least one of a SRS resource set, a SRS resource, or a SRS port. The method further includes communicating, by the network with the wireless communication device, using the transmission TEG information.

In some embodiments, the method further includes sending, by the network to the wireless communication device, configuration of the SRS transmission, wherein the configuration of SRS transmission includes the transmission TEG information.

In some embodiments, determining the transmission TEG information of the wireless communication device includes receiving, by the network from the wireless communication device, the UE capability. The UE capability includes the transmission TEG information, and the transmission TEG information is determined by the wireless communication device according to the at least one of the usage of the SRS transmission, the UE antenna coherent capability, the UE antenna switching capability, or the SRS port.

In some embodiments, the method further includes receiving, by the network from the wireless communication device, UE capability. In some embodiments, the UE capability includes an indication of whether the wireless communication device supports a SRS resource configured for performing configured usage and for determining UE Rx-Tx time difference measurement. In some embodiments, the UE capability includes an indication of whether a pair of reception TEG and transmission TEG is assumed as a combination. In some embodiments, the UE capability includes at least one pair of reception TEG and transmission TEG that can be assumed as a combination.

Another embodiment relates to a wireless communication apparatus includes at least one processor and a memory, wherein the at least one processor is configured to read code from the memory and implement the above method.

Another embodiment relates to a computer program product includes a computer-readable program medium code stored thereupon, the code, when executed by at least one processor, causing the at least one processor to implement the above method.

BRIEF DESCRIPTION OF THE DRAWINGS

FIGS. 4, 5, 6, 7, 8, 9, 10, 11, 12, and 13 illustrate flow charts of example wireless communication processes in accordance with some embodiments of the present disclosure.

DETAILED DESCRIPTION

Various example embodiments of the present solution are described below with reference to the accompanying figures to enable a person of ordinary skill in the art to make and use the present solution. As would be apparent to those of ordinary skill in the art, after reading the present disclosure, various changes or modifications to the examples described herein can be made without departing from the scope of the present solution. Thus, the present solution is not limited to the example embodiments and applications described and illustrated herein. Additionally, the specific order or hierarchy of steps in the methods disclosed herein are merely example approaches. Based upon design preferences, the specific order or hierarchy of steps of the disclosed methods or processes can be re-arranged while remaining within the scope of the present solution. Thus, those of ordinary skill in the art will understand that the methods and techniques disclosed herein present various steps or acts in a sample order, and the present solution is not limited to the specific order or hierarchy presented unless expressly stated otherwise.

Accurate and precise positioning of UE is important in 5G NR technology. Positioning methods can provide the UE the precise location information. However, there are timing delays or timing errors between the baseband and antenna both at the transmission and reception point (TRP) side and the UE side, which perturb the measurement results in timing-based positioning methods and can be measured or cancelled to increase measurement accuracy. There are TEGs in which the measurements or signals have the same timing delays or timing errors. In uplink time difference of arrival (UL-TDOA), uplink angle of arrival (UL-AoA) or multi-round trip time (multi-RTT), the SRS transmission can be associated with the TEGs. Disclose is are SRS-involved positioning systems and methods when the timing errors and/or TEGs exist, including how to associate SRS transmission with transmitter (Tx) TEG information, and relatively UE capability report.

1. Mobile Communication Technology and Environment

Figure 1:
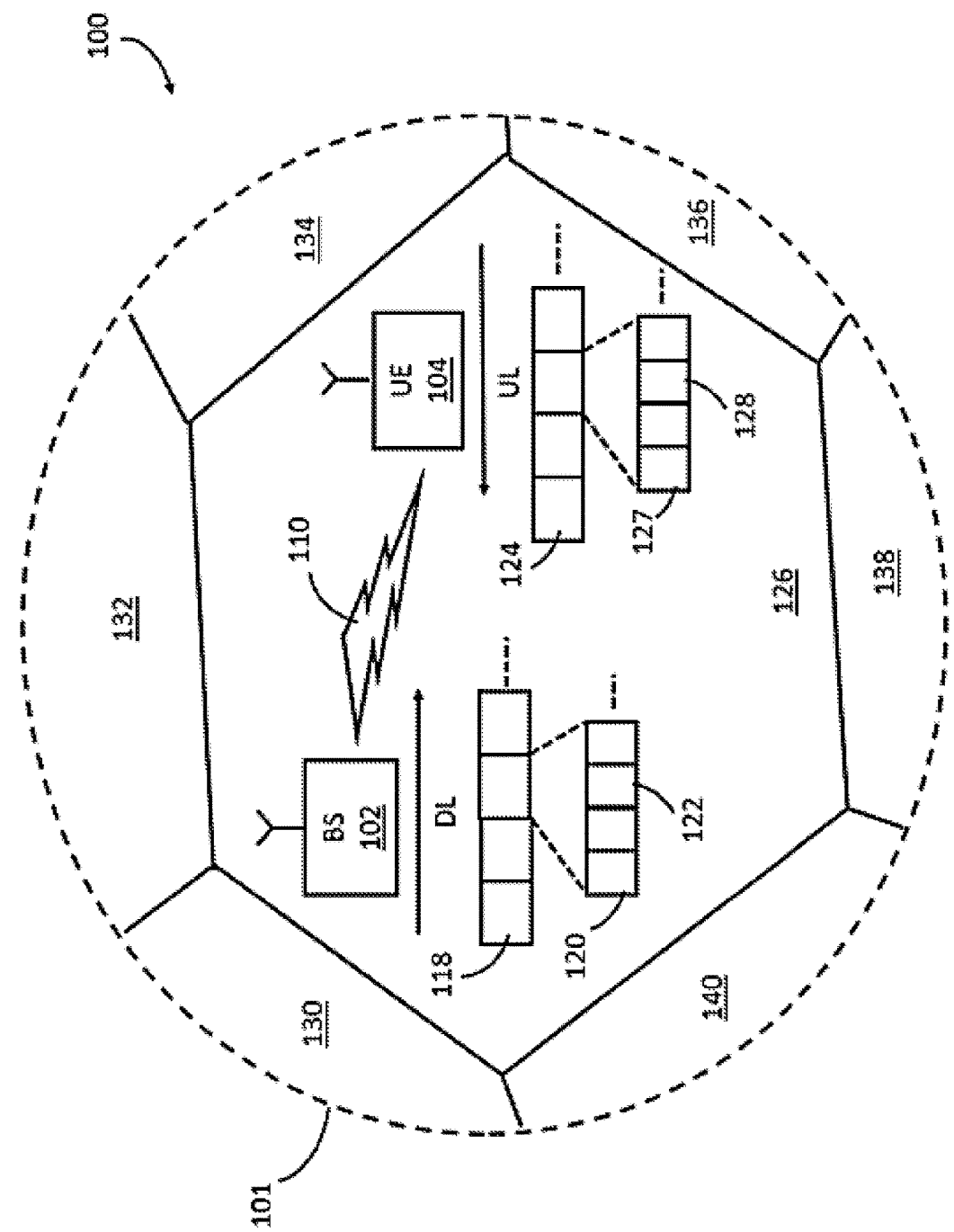
FIG. 1 illustrates an example wireless communication system in which techniques disclosed herein can be implemented, in accordance with some embodiments of the present disclosure.

FIG. 1 illustrates an example wireless communication system 100 in which techniques disclosed herein can be implemented, in accordance with some embodiments of the present disclosure. In the following discussion, the wireless communication system 100 may implement any wireless network, such as a cellular network or a narrowband Internet of things (NB-IoT) network. Such an example system 100 includes a base station (BS) 102 (also referred to as a wireless communication node) and UE 104 (also referred to as a wireless communication device) that can communicate with each other via a communication link 110 (e.g., a wireless communication channel), and a cluster of cells 126, 130, 132, 134, 136, 138 and 140 overlaying a geographical area 101. In some examples, a network refers to one or more BSs (e.g., the BS 102) in communication with the UE 104, as well as backend entities and functions (e.g., a Location Management Function (LMF)). In other words, the network refers to components of the system 100 other than the UE 104. In FIG. 1, the BS 102 and UE 104 are included within a respective geographic boundary of cell 126. Each of the other cells 130, 132, 134, 136, 138 and 140 may include at least one base station operating at its allocated bandwidth to provide adequate radio coverage to its intended users.

For example, the BS 102 may operate at an allocated channel transmission bandwidth to provide adequate coverage to the UE 104. The BS 102 and the UE 104 may communicate via a downlink radio frame 118, and an uplink radio frame 124 respectively. Each radio frame 118/124 may be further divided into sub-frames 120/127 which may include data symbols 122/128. In the present disclosure, the BS 102 and UE 104 are described herein as non-limiting examples of "communication nodes," generally, which can practice the methods disclosed herein. Such communication nodes may be capable of wireless and/or wired communications, in accordance with various embodiments of the present solution.

Figure 2:
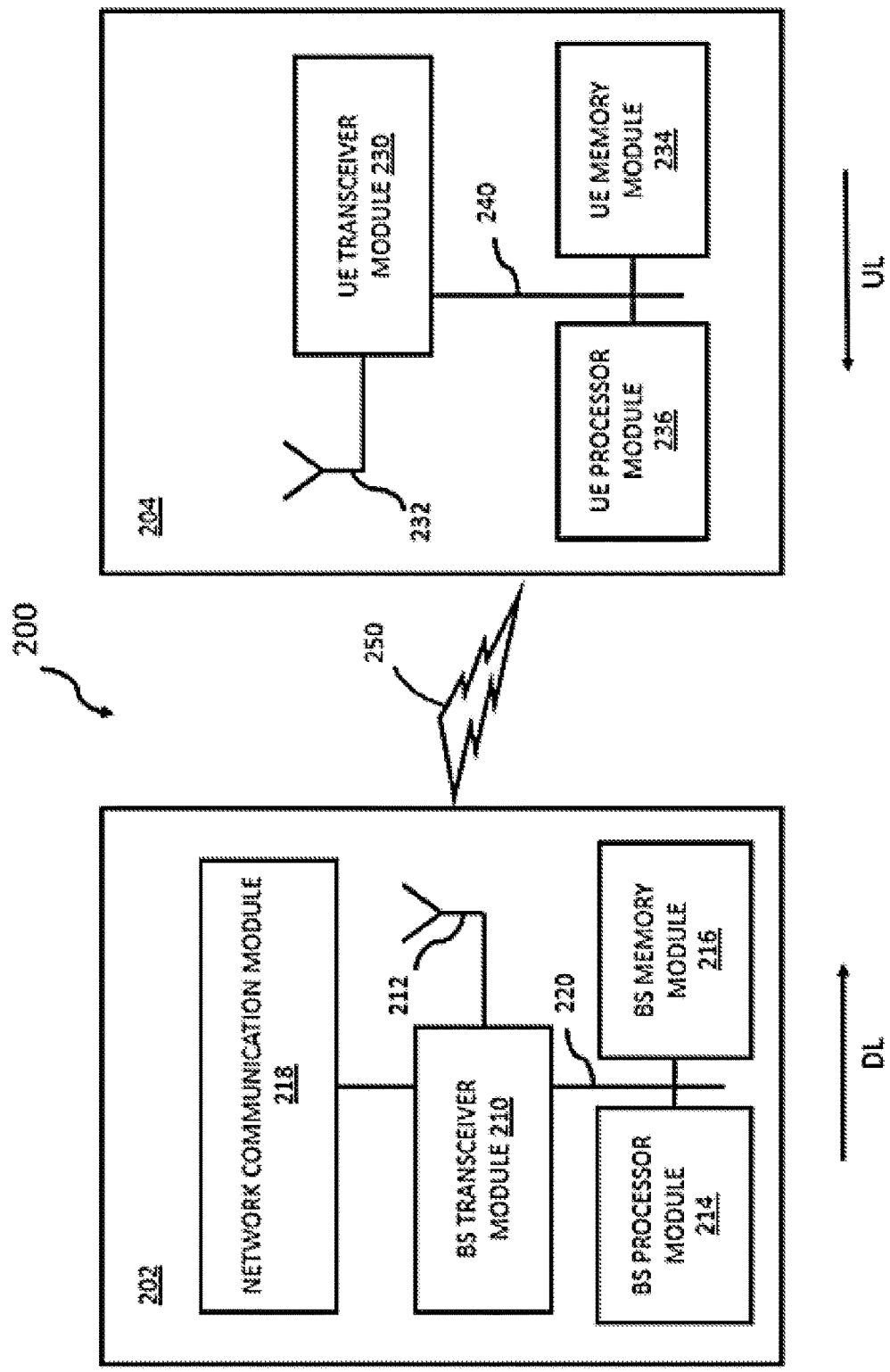
FIG. 2 illustrates a block diagram of an example wireless communication system for transmitting and receiving wireless communication signals (e.g., orthogonal frequency-division multiplexing (OFDM) or orthogonal frequency-division multiple access (OFDMA) signals) in accordance with some embodiments of the present disclosure.

FIG. 2 illustrates a block diagram of an example wireless communication system 200 for transmitting and receiving wireless communication signals (e.g., orthogonal frequency-division multiplexing (OFDM) or orthogonal frequency-division multiple access (OFDMA) signals) in accordance with some embodiments of the present disclosure. The system 200 may include components and elements configured to support known or conventional operating features that need not be described in detail herein. In one illustrative embodiment, system 200 can be used to communicate (e.g., transmit and receive) data symbols in a wireless communication environment such as the system 100 of FIG. 1, as described above.

System 200 generally includes a base station 202 (hereinafter "BS 202") and a user equipment device 204 (hereinafter "UE 204"). The BS 202 includes a BS (base station) transceiver module 210, a BS antenna 212, a BS processor module 214, a BS memory module 216, and a network communication module 218, each module being coupled and interconnected with one another as necessary via a data communication bus 220. The UE 204 includes a UE (user equipment) transceiver module 230, a UE antenna 232, a UE memory module 234, and a UE processor module 236, each module being coupled and interconnected with one another as necessary via a data communication bus 240. The BS 202 communicates with the UE 204 via a communication channel 250, which can be any wireless channel or other medium suitable for transmission of data as described herein.

As would be understood by persons of ordinary skill in the art, system 200 may further include any number of modules other than the modules shown in FIG. 2. Those skilled in the art will understand that the various illustrative blocks, modules, circuits, and processing logic described in connection with the embodiments disclosed herein may be implemented in hardware, computer-readable software, firmware, or any practical combination thereof. To clearly illustrate this interchangeability and compatibility of hardware, firmware, and software, various illustrative components, blocks, modules, circuits, and steps are described generally in terms of their functionality. Whether such functionality is implemented as hardware, firmware, or software can depend upon the particular application and design constraints imposed on the overall system. Those familiar with the concepts described herein may implement such functionality in a suitable manner for each particular application, but such implementation decisions should not be interpreted as limiting the scope of the present disclosure In accordance with some embodiments, the UE transceiver 230 may be referred to herein as an "uplink" transceiver 230 that includes a radio frequency (RF) transmitter and a RF receiver each including circuitry that is coupled to the antenna 232. A duplex switch (not shown) may alternatively couple the uplink transmitter or receiver to the uplink antenna in time duplex fashion. Similarly, in accordance with some embodiments, the BS transceiver 210 may be referred to herein as a "downlink" transceiver 210 that includes a RF transmitter and a RF receiver each including circuitry that is coupled to the antenna 212. A downlink duplex switch may alternatively couple the downlink transmitter or receiver to the downlink antenna 212 in time duplex fashion. The operations of the two transceiver modules 210 and 230 may be coordinated in time such that the uplink receiver circuitry is coupled to the uplink antenna 232 for reception of transmissions over the wireless transmission link 250 at the same time that the downlink transmitter is coupled to the downlink antenna 212. Conversely, the operations of the two transceivers 210 and 230 may be coordinated in time such that the downlink receiver is coupled to the downlink antenna 212 for reception of transmissions over the wireless transmission link 250 at the same time that the uplink transmitter is coupled to the uplink antenna 232. In some embodiments, there is close time synchronization with a minimal guard time between changes in duplex direction.

The UE transceiver 230 and the base station transceiver 210 are configured to communicate via the wireless data communication link 250, and cooperate with a suitably configured RF antenna arrangement 212/232 that can support a particular wireless communication protocol and modulation scheme. In some illustrative embodiments, the UE transceiver 210 and the base station transceiver 210 are configured to support industry standards such as the Long Term Evolution (LTE) and emerging 5G standards, and the like. It is understood, however, that the present disclosure is not necessarily limited in application to a particular standard and associated protocols. Rather, the UE transceiver 230 and the base station transceiver 210 may be configured to support alternate, or additional, wireless data communication protocols, including future standards or variations thereof.

In accordance with various embodiments, the BS 202 may be an evolved node B (eNB), a serving eNB, a target eNB, a femto station, or a pico station, for example. In some embodiments, the UE 204 may be embodied in various types of user devices such as a mobile phone, a smart phone, a personal digital assistant (PDA), tablet, laptop computer, wearable computing device, etc. The processor modules 214 and 236 may be implemented, or realized, with a general purpose processor, a content addressable memory, a digital signal processor, an application specific integrated circuit, a field programmable gate array, any suitable programmable logic device, discrete gate or transistor logic, discrete hardware components, or any combination thereof, designed to perform the functions described herein. In this manner, a processor may be realized as a microprocessor, a controller, a microcontroller, a state machine, or the like. A processor may also be implemented as a combination of computing devices, e.g., a combination of a digital signal processor and a microprocessor, a plurality of microprocessors, one or more microprocessors in conjunction with a digital signal processor core, or any other such configuration.

Furthermore, the steps of a method or algorithm described in connection with the embodiments disclosed herein may be embodied directly in hardware, in firmware, in a software module executed by processor modules 214 and 236, respectively, or in any practical combination thereof. The memory modules 216 and 234 may be realized as RAM memory, flash memory, ROM memory, EPROM memory, EEPROM memory, registers, a hard disk, a removable disk, a CD-ROM, or any other form of storage medium known in the art. In this regard, memory modules 216 and 234 may be coupled to the processor modules 210 and 230, respectively, such that the processors modules 210 and 230 can read information from, and write information to, memory modules 216 and 234, respectively. The memory modules 216 and 234 may also be integrated into their respective processor modules 210 and 230. In some embodiments, the memory modules 216 and 234 may each include a cache memory for storing temporary variables or other intermediate information during execution of instructions to be executed by processor modules 210 and 230, respectively. Memory modules 216 and 234 may also each include non-volatile memory for storing instructions to be executed by the processor modules 210 and 230, respectively.

The network communication module 218 generally represents the hardware, software, firmware, processing logic, and/or other components of the base station 202 that enable bi-directional communication between base station transceiver 210 and other network components and communication nodes configured to communication with the base station 202. For example, network communication module 218 may be configured to support internet or WiMAX traffic. In a typical deployment, without limitation, network communication module 218 provides an 802.3 Ethernet interface such that base station transceiver 210 can communicate with a conventional Ethernet based computer network. In this manner, the network communication module 218 may include a physical interface for connection to the computer network (e.g., Mobile Switching Center (MSC)). The terms "configured for," "configured to" and conjugations thereof, as used herein with respect to a specified operation or function, refer to a device, component, circuit, structure, machine, signal, etc., that is physically constructed, programmed, formatted and/or arranged to perform the specified operation or function.

The Open Systems Interconnection (OSI) Model (referred to herein as, "open system interconnection model") is a conceptual and logical layout that defines network communication used by systems (e.g., wireless communication device, wireless communication node) open to interconnection and communication with other systems. The model is broken into seven subcomponents, or layers, each of which represents a conceptual collection of services provided to the layers above and below it. The OSI Model also defines a logical network and effectively describes computer packet transfer by using different layer protocols. The OSI Model may also be referred to as the seven-layer OSI Model or the seven-layer model. In some embodiments, a first layer may be a physical layer. In some embodiments, a second layer may be a Medium Access Control (MAC) layer. In some embodiments, a third layer may be a Radio Link Control (RLC) layer. In some embodiments, a fourth layer may be a Packet Data Convergence Protocol (PDCP) layer. In some embodiments, a fifth layer may be a Radio Resource Control (RRC) layer. In some embodiments, a sixth layer may be a Non Access Stratum (NAS) layer or an Internet Protocol (IP) layer, and the seventh layer being the other layer.

Figure 3:
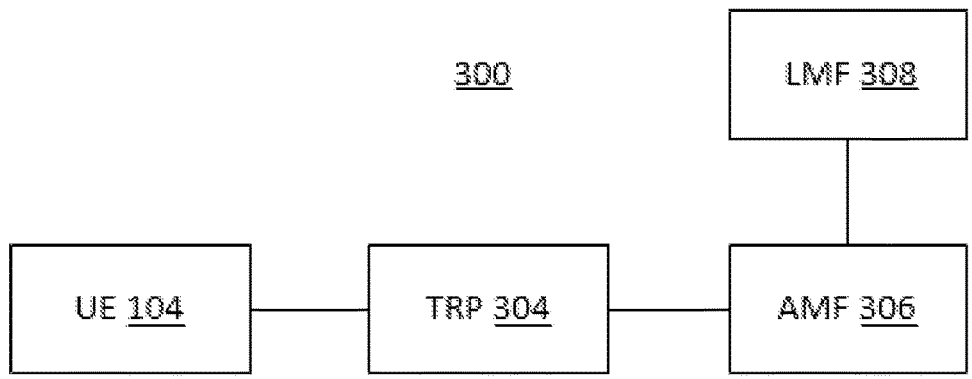
FIG. 3 illustrates a high-level schematic of a 5G core positioning architecture for NG-RAN in accordance with some embodiments of the present disclosure.

Referring to FIG. 3, a system 300 is shown, according to some embodiments. The UE 104 can be communicatively connected to a TRP 304. An example of the TRP 304 is the BS 102. An access and mobility management function (AMF) 306 receives requests and handles connection or mobility management. For example, the AMF 306 sends location service requests to a LMF 308. The LMF 308 can process the location services request and returns a result of the location service back to the AMF 306. The AMF 306 can return the location service back to the TRP 304.

2. Methods for Indicating Positioning Information

Receiver (Rx) and Tx timing delays between baseband and RF chains are embedded in timing measurements, since the time is recorded at the baseband while the time duration measured for positioning (e.g., propagation time) is cut off at the antenna side for both in TRP and UE. In the present disclosure, the timing delay can be called a timing error, transmission delay, transmission error, group delay or group error. The BS 102 can be the next generation NodeB (gNB) or the TRP.

A TEG is a group of UL/DL positioning signals or DL/UL measurements that have the same timing error or have timing errors within a certain margin. Tx TEG means the transmitting positioning signals in the group have the same Tx timing error or have timing errors within a certain margin. Rx TEG means the UL or DL measurements in the group have the same Rx timing error or have timing errors within a certain margin. A TRP may include multiple Tx TEGs and/or multiple Rx TEGs. A UE may have multiple Tx TEGs and/or multiple Rx TEGs. A TRP Tx TEG may associate with multiple PRS resources or PRS resource sets, and a UE Tx TEG may associate with multiple SRS resources or SRS resource sets.

For example, the TEG can be divided or grouped according to frequency layers, beams (e.g., spatial transmission filter), and/or panels (e.g., RF chain, antenna). For example, the PRS resources or PRS resource sets in a frequency layer, with the sending beam, on one of the panel are within one TRP Tx TEG. As another example, the PRS resources or PRS resource sets in another frequency layer, with the same sending beam, on the same panel may be within another TRP Tx TEG.

For example, the gNB can determine that the PRS resources or PRS resource sets in a single TRP with the same configured/indicated coordinates are within one TRP Tx TEG. The gNB can determine the UL measurements derived from SRS resources that are configured with the same PRS resources coordinates are within one TRP Rx TEG. Or the gNB can determine that the UL measurements derived from SRS resources that are configured with the same PRS resources are within one TRP Tx TEG.

For a UE, the DL measurements may include or belong to one or multiple measurement types, including relative signal time difference (RSTD) measurements, relative signal received power (RSRP) measurements or Rx-Tx time difference measurements. For a TRP, the UL measurements may include or belong to one or multiple measurement types, including relative time of arrival (RTOA) measurements, RSRP measurements or Rx-Tx time difference measurements.

For the UL-TDOA, UL-AoA and multi-RTT methods, the TRPs can receive SRS resources, and TRPs/LMF can know the UE Tx TEG information associated with SRS resources, SRS resource sets, or SRS resource ports.

UE antenna coherent capability comprises non-coherent, partial-coherent and full coherent. UE antenna port switching capability can include 1T1R, 1T2R, 1T4R, 1T6R, 1T8R, 2T2R, 2T6R, 2T8R, 4T8R and 4T4R. In this disclosure, "1T1R" for example means a 1 transmitter and 1 receiver. The transmitter can be transmission RF chain or transmission antenna port or UE transmission panel, and the receiver can be reception RF chain, or reception antenna port, or UE reception panel.

The UE can support TEG. This information of UE supporting TEG can be reported as a UE capability.

If the Tx TEG can be associated with the SRS port, e.g., UE has the capability to associate Tx TEG with SRS antenna port, the Tx TEG also can be associated with the SRS resource.

The network mentioned in claims means TRP or gNB or LMF.

A. The UE can Determine the Tx TEG Information According to the SRS Antenna Port The UE can determine the Tx TEG information according to the SRS antenna port. The UE reports the Tx TEG information with port information to the gNB/TRP or LMF. If the UE has 2 antenna ports, each port can be associated with a Tx TEG. Different UE antenna ports or antenna ports combination can be associated with different Tx TEGs. For example, if the UE has 4 antenna ports, each port can be associated with a Tx TEG, or 2 ports can be associated with a Tx TEG, and the other 2 ports can be associated with another Tx TEG, or 3 ports can be associated with a Tx TEG, the other 1 port can be associated with another Tx TEG. UE can report its capability on number of Tx TEGs it can support and/or relationship between ports and Tx TEG, e.g., which ports associate with which Tx TEG.

B. The UE can Determine the Relationship Between Tx TEG and SRS Transmission According to the Usage of the SRS Transmission When SRS with the MIMO usage is used for positioning:

If the SRS is configured with the usage of "codebook" if the SRS has more than 1 Tx port, the Tx TEG can be configured to associate with SRS port, or Tx TEG can be configured to associate with SRS resource.

If the SRS is configured with the usage of "non-codebook," Tx TEG can be configured to associate with the SRS port, or the Tx TEG can be configured to associate with SRS resource.

If the SRS is configured with the usage of "beam management," the Tx TEG can be configured to associate with SRS port, SRS resource or SRS resource set.

If the SRS is configured with the usage of "antenna switching," the Tx TEG can be configured to associate with SRS resource, or the SRS port.

C. Tx TEG Configured to Associate with SRS Resource or the SRS Port Depending on SRS Antenna Port Switching Capability If the SRS is configured with the usage of "antenna switching," whether the Tx TEG can be configured to associate with the SRS resource or the SRS port depends on the SRS antenna port switching capability:

If the UE antenna port switching capability corresponds to one of 1T1R, 1T2R, 1T4R, 1T6R, or 1T8R, the transmission TEG information can be associated with the at least one SRS resource.

If the UE antenna port switching capability corresponds to 2T2R or 4T4R, the transmission TEG information can be associated with the at least one SRS port.

If the UE antenna port switching capability corresponds to one of 2T4R, 2T6R, 2T8R, or 4T8R, the transmission TEG information can be associated with the at least one SRS resource or the at least one SRS port.

D. UE Determines the Number of Tx TEGs According to the Antenna Coherent Transmission Capability If UE can support Tx TEGs associated with SRS ports, the UE can determine the number of Tx TEGs according to the antenna coherent transmission capability. For non-coherent UE, the UE can support x number of Tx TEGs, where $0 \leq x \leq 4$. For partial-coherent UE, the UE can support y number of Tx TEGs, where $0 \leq y \leq 2$. For full-coherent UE, the UE can support z number of Tx TEGs, $0 \leq z \leq 1$. The x, y, z are all integers. The actual value of x, y, z can be reported from the UE to TRP/gNB/LMF as a UE capability, or, LMF/gNB can know the maximum value of x, y, z as a prefined rule once LMF/gNB knows the UE antenna coherent transmission capability. If $x=4$, or $y=2$, or $z=1$, the UE can support up to x, y or z number of TEGs. The supported TEG number is for a single SRS resource, or for all SRS resources.

For example, if the SRS is configured with the usage of "codebook," for 1) a 4 Tx port UE, 2) full power mode 0 and mode 1, 3) non-coherent UE, the UE can support 4 Tx TEGs, each port belongs to a Tx TEG. For partial-coherent UE, the UE can support 2 Tx TEGs, the SRS ports that are coherent can be associated with a Tx TEG. For full-coherent UE, the UE can support 1 Tx TEG, and all coherent SRS ports can be associated with a Tx TEG. The UE can report these information to LMF or gNB as the UE capability.

Alternatively, in some embodiments, the UE can report a certain number of Tx TEG the UE can support as a UE capability regardless of UE antenna coherent transmission capability. The number can be 0, 1, 2, 3 or 4. The UE can also report the association between the SRS port and the Tx TEG. For example, when there are 4 Tx port UE, the UE can report that it supports 2 Tx TEGs, and the UE also reports SRS ports 0 and 1 are associated with a first Tx TEG (Tx TEG1), and the SRS ports 2 and 3 are associated with a second Tx TEG (Tx TEG2).

The UE can report this information directly to the LMF. If the UE reports UE capability to the LMF, the UE capability mentioned above can be configured in NR-UL-SRS-Capability IE in the LPPa protocol. If the UE reports the UE capability to the LMF, the UE can receive the SRS configuration first. If the UE reports UE capability to the gNB/TRP, the above information can be configured in UE-NR-Capability IE defined in 3GPP Specification numbers 38.331 and 38.306.

E. Predefine which Tx port(s) is associated with which Tx TEGs

In some embodiments, the Tx port(s) is associated with which Tx TEGs can be predefined. If the SRS usage is set to the codebook, UE can report Tx TEG number as 2, which means that the UE can support up to 2 Tx TEGs, or the UE is expected to be scheduled with 2 Tx TEGs. For an SRS with 2 Tx ports, each Tx TEG can be associated with a port. For an SRS with 4 Tx ports, the first TEG can be associated with 2 Tx ports, and the second TEG can be associated with another 2 Tx ports. In some embodiments, the first TEG can be associated with SRS ports 0 and 2, and the second TEG can be associated with SRS ports 1 and 3.

When the gNB configures the SRS configuration to the UE, the UE can receive the indication of the SRS antenna port. Each SRS port can be associated with a Tx TEG identification (ID).

When the gNB configures the SRS configuration to the UE, the UE can receive the indication of the SRS TEG ID. Each TEG ID can be associated with one or more SRS antenna ports.

F. UE Reports the Associated Relationship of SRS Port and Tx TEG as a UE Capability The UE can report the relationship between the SRS port and the Tx TEG as a UE capability. For example, if the SRS usage is set to the codebook, for a 4 Tx port UE, the UE can report the Tx TEG number as 2, which means the UE can support up to 2 Tx TEGs, or the UE is expected to be scheduled with 2 Tx TEGs. The UE can also report that its ports 0 and 2 are associated with the first Tx TEG, and its ports 1 and 3 are associated with the second Tx TEG.

If the UE reports the UE capability to the LMF, the UE capability mentioned above can be configured in NR-UL-SRS-Capability IE in LPPa protocol. If the UE reports the UE capability to the gNB/TRP, the above information can be configured in UE-NR-Capability IE defined in 3GPP Specification numbers 38.331 and 38.306.

G. UE Reports its Port Information as a UE Capability

The port information can be the distance between ports, or architecture of the ports. If the UE has 2 ports, the 2 ports are in different coordinates, or the coordinates between the ports are larger than a certain margin, then, regardless of whether the ports are non-coherent, partial-coherent or full-coherent, the LMF or TRP can determine that these 2 different ports belong to different Tx TEGs.

H. The port of SRS can be configured with UE Tx TEG by the serving gNB

The port of the SRS can be configured with UE Tx TEG by the serving gNB. For example in the UL-TDOA method, the LMF can request the SRS information. Then the serving gNB reports the SRS configuration with the SRS port associated with the UE Tx TEG information to the LMF. Then the LMF can broadcast the SRS configuration with the SRS port associated with the UE Tx TEG information to all TRPs participating in this measurement. The UE can send the SRS according to the received port information with the Tx TEG information.

I. UE Supports the Use MIMO SRS in Multi-RTT Method

The UE can support the use of MIMO SRS in the multi-RTT method. The MIMO SRS can be configured with a label indicating that the MIMO SRS is only used for the configured MIMO usage, or the MIMO SRS can be used for MIMO usage and calculating UE Rx-Tx time difference value in positioning. The label can be configured in SRS-Config IE in 3GPP Specification number 38.331. The label can be a new usage of SRS resource/SRS resource set, or a parameter of 2 values indicating per SRS resource or per SRS resource set.

The UE can report whether it can support a single SRS resource to perform MIMO usage and to measure Rx-Tx time difference measurement as a UE capability. The UE can report this capability for each SRS usage.

J. UE Reports its Capability of Whether a {Rx TEG, Tx TEG} Pair can be Determined as a Combination The UE can report its capability of whether a {Rx TEG, Tx TEG} pair can be determined as a combination and report which {Rx TEG, Tx TEG} pair can be determined as a combination.

Different combinations can be within one RxTx TEG. For example, for 2 {Rx TEG, Tx TEG} pairs, i.e., 2 combinations are in the same RxTx TEG, that means the 2 combinations have the same reception timing error+transmission timing error. In this way, UE only needs to report its receiving and transmitting behavior to the LMF, and the LMF will combine the Rx-Tx time difference measurements according to this UE capability.

Figure 4:

FIG. 4 illustrates a flow chart of an example wireless communication process 400 according to some embodiments. The process 400 is performed by the UE. The process 400 includes determining, by a wireless communication device, transmission TEG information of the wireless communication device according to at least one of usage of SRS transmission, UE antenna coherent capability, UE antenna switching capability, or SRS port (402). The transmission TEG information includes at least one of a number of transmission TEGs, an association between the transmission TEGs and SRS transmission. The SRS transmission includes at least one of a SRS resource set, a SRS resource, or a SRS port. The process 400 includes communicating, by the wireless communication device with a network, using the transmission TEG information (404).

Figure 5:
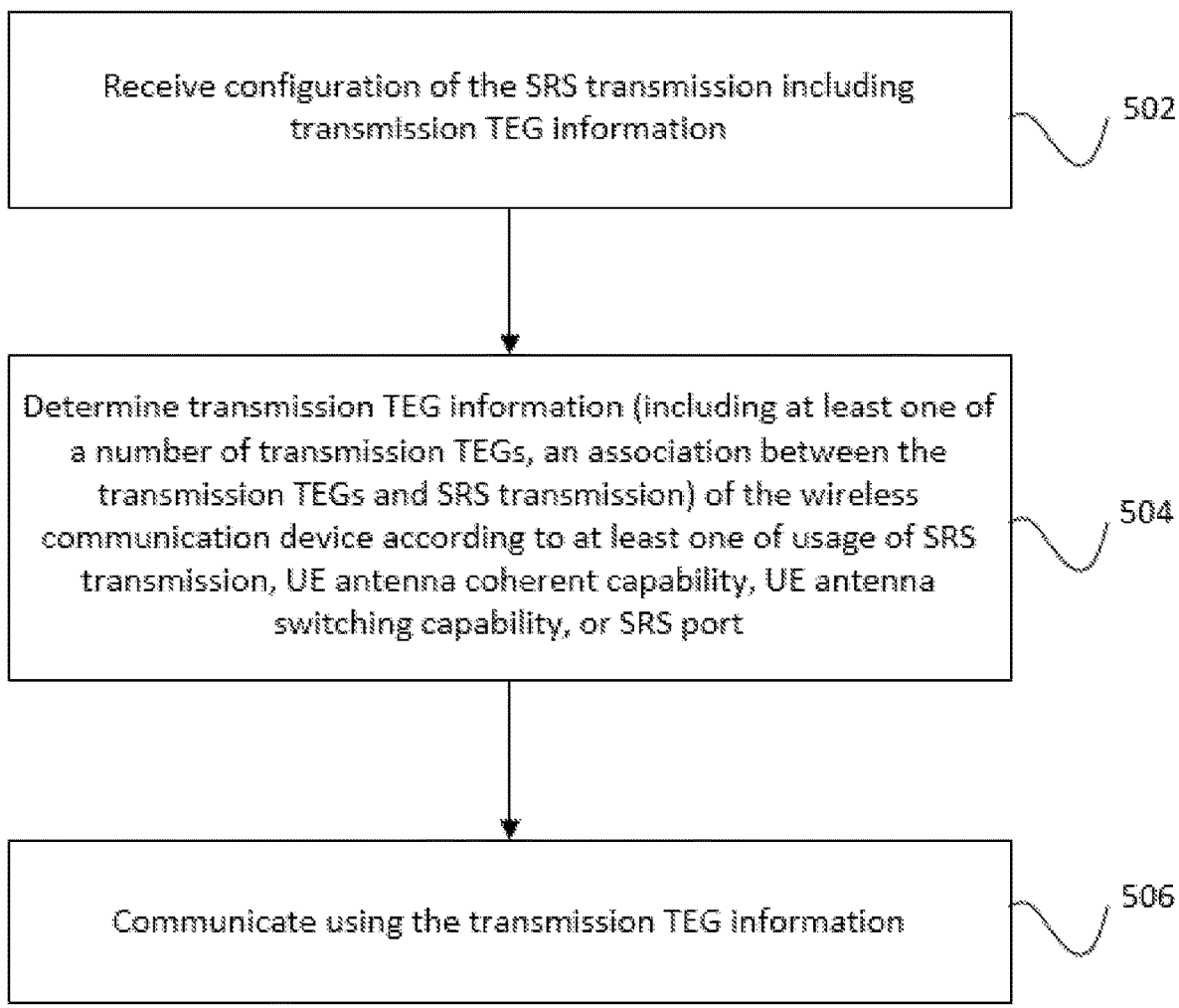

FIG. 5 illustrates a flow chart of an example wireless communication process 500, according to some embodiments. The process 500 is performed by the UE. The process 500 includes receiving, by the wireless communication device from the network, configuration of the SRS transmission, which includes the transmission TEG information (502). The process 500 includes determining, by a wireless communication device, transmission TEG information of the wireless communication device according to at least one of usage of SRS transmission, UE antenna coherent capability, UE antenna switching capability, or SRS port (504). The transmission TEG information includes at least one of a number of transmission TEGs, an association between the transmission TEGs and SRS transmission. The SRS transmission includes at least one of a SRS resource set, a SRS resource, or a SRS port. The process 500 includes communicating, by the wireless communication device with a network, using the transmission TEG information (506).

Figure 6:
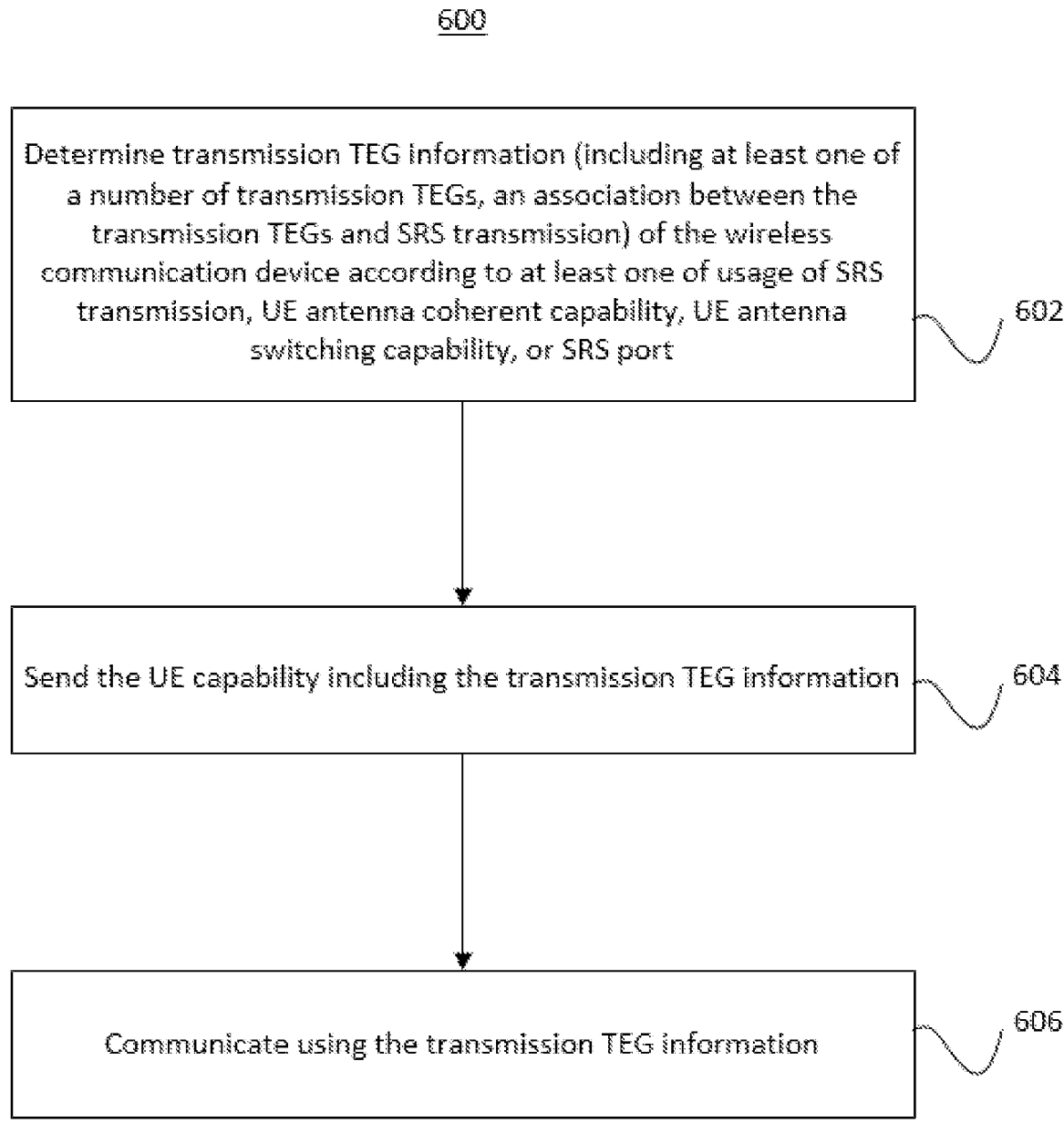

FIG. 6 illustrates a flow chart of an example wireless communication process 600, according to some embodiments. The process 600 is performed by the UE. The process 600 includes determining, by a wireless communication device, transmission TEG information of the wireless communication device according to at least one of usage of SRS transmission, UE antenna coherent capability, UE antenna switching capability, or SRS port (602). The transmission TEG information includes at least one of a number of transmission TEGs, an association between the transmission TEGs and SRS transmission. The SRS transmission includes at least one of a SRS resource set, a SRS resource, or a SRS port. The process 600 includes sending, by the wireless communication device to the network, the UE capability including the transmission TEG information (604). The process 600 includes communicating, by the wireless communication device with a network, using the transmission TEG information (606).

FIG. 7 illustrates a flow chart of an example wireless communication process 700, according to some embodiments. The process 700 is performed by the UE. The process 700 includes determining transmission TEG information of the wireless communication device according to at least one of usage of SRS transmission, UE antenna coherent capability, UE antenna switching capability, or SRS port (702). The transmission TEG information includes at least one of a number of transmission TEGs, an association between the transmission TEGs and SRS transmission. The SRS transmission includes at least one of a SRS resource set, a SRS resource, or a SRS port. The process 700 includes reporting UE capability including an indication of whether the UE supports a SRS resource configured for performing configured usage and for determining UE Rx-Tx time difference measurement (704). The process 700 includes communicating, by the wireless communication device with a network, using the transmission TEG information (706).

FIG. 8 illustrates a flow chart of an example wireless communication process 800, according to some embodiments. The process 800 is performed by the UE. The process 800 includes determining, by a wireless communication device, transmission TEG information of the wireless communication device according to at least one of usage of SRS transmission, UE antenna coherent capability, UE antenna switching capability, or SRS port (802). The transmission TEG information includes at least one of a number of transmission TEGs, an association between the transmission TEGs and SRS transmission. The SRS transmission includes at least one of a SRS resource set, a SRS resource, or a SRS port. The process 800 includes reporting UE capability including an indication of whether a pair of reception TEG and transmission TEG is assumed as a combination (804). The process 800 includes communicating, by the wireless communication device with a network, using the transmission TEG information (806).

Figure 9:
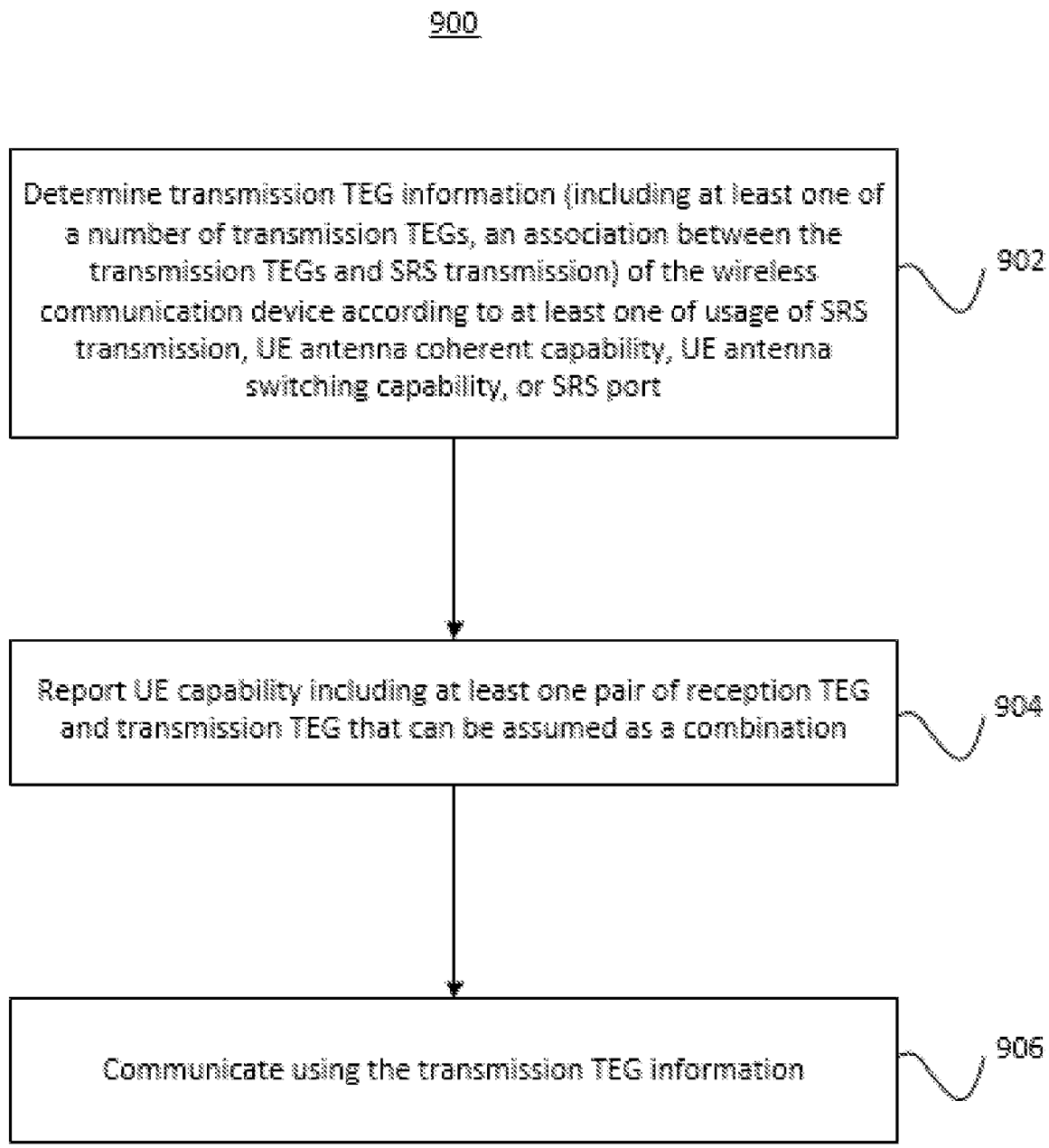

FIG. 9 illustrates a flow chart of an example wireless communication process 900, according to some embodiments. The process 900 is performed by the UE. The process 900 includes determining, by a wireless communication device, transmission TEG information of the wireless communication device according to at least one of usage of SRS transmission, UE antenna coherent capability, UE antenna switching capability, or SRS port (902). The transmission TEG information includes at least one of a number of transmission TEGs, an association between the transmission TEGs and SRS transmission. The SRS transmission includes at least one of a SRS resource set, a SRS resource, or a SRS port. The process 900 includes reporting UE capability including at least one pair of reception TEG and transmission TEG that can be assumed as a combination (904). The process 900 includes communicating, by the wireless communication device with a network, using the transmission TEG information (906).

FIG. 10 illustrates a flow chart of an example wireless communication process 1000, according to some embodiments. The process 1000 is performed by the TRP. The process 1000 includes determining transmission TEG information of a wireless communication device, the transmission TEG information determined based on at least one of usage of SRS transmission, UE antenna coherent capability, UE antenna switching capability, or SRS port (1002). The transmission TEG information includes at least one of a number of transmission TEGs, an association between the transmission TEGs, and SRS transmission. The SRS transmission includes at least one of a SRS resource set, a SRS resource, or a SRS port. The process 1000 includes communicating using the transmission TEG information (1004).

Figure 11:
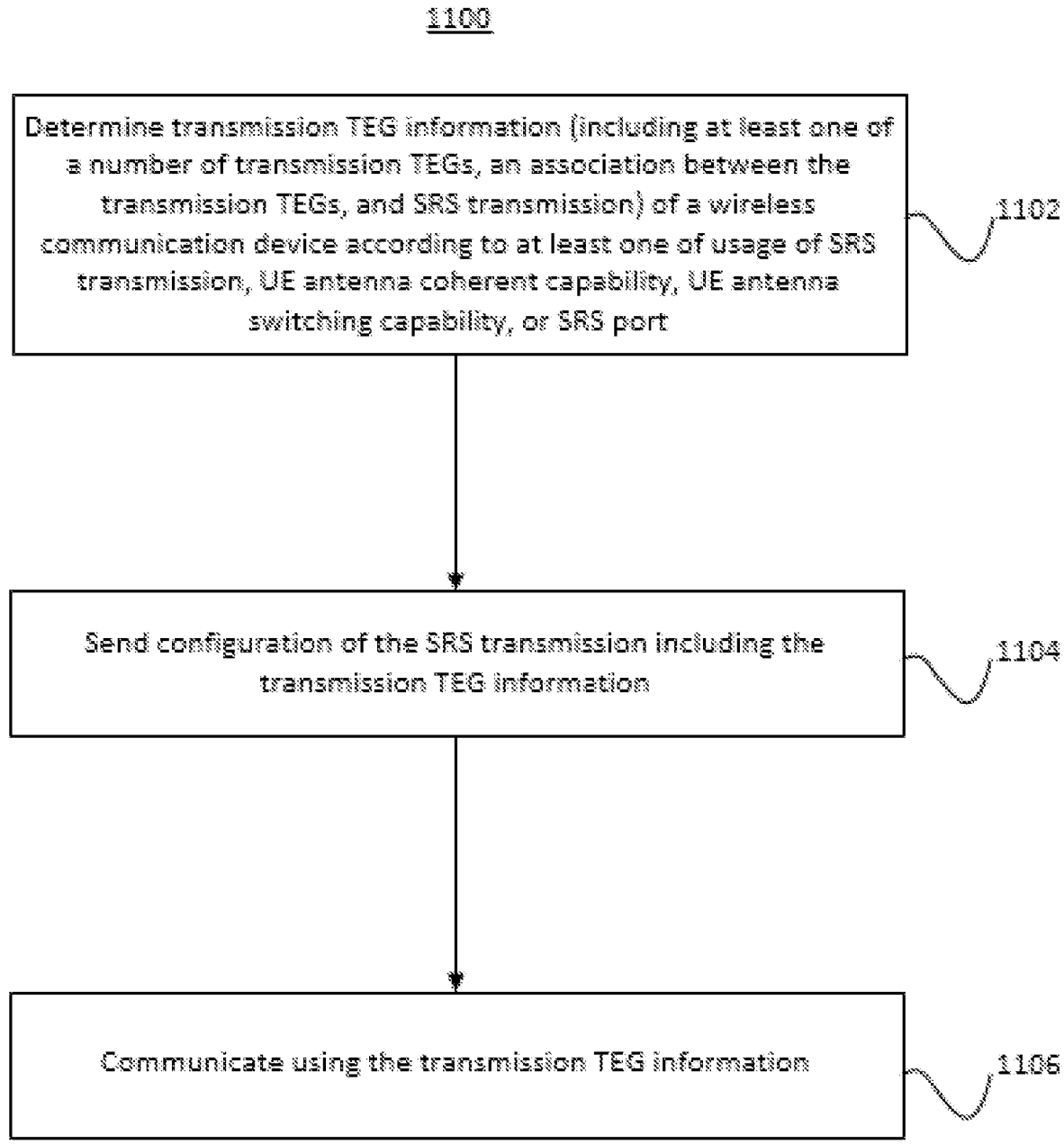

FIG. 11 illustrates a flow chart of an example wireless communication process 1100, according to some embodiments. The process 1100 is performed by the TRP. The process 1100 includes determining transmission TEG information of a wireless communication device, the transmission TEG information determined based on at least one of usage of SRS transmission, UE antenna coherent capability, UE antenna switching capability, or SRS port (1102). The transmission TEG information includes at least one of a number of transmission TEGs, an association between the transmission TEGs, and SRS transmission. The SRS transmission includes at least one of a SRS resource set, a SRS resource, or a SRS port. The process 1100 includes sending configuration of the SRS transmission including the transmission TEG information (1104). The process 1100 includes communicating using the transmission TEG information (1106).

FIG. 12 illustrates a flow chart of an example wireless communication process 1200, according to some embodiments. The process 1200 is performed by the TRP. The process 1200 includes determining transmission TEG information of a wireless communication device, the transmission TEG information determined based on at least one of usage of SRS transmission, UE antenna coherent capability, UE antenna switching capability, or SRS port (1202). The transmission TEG information includes at least one of a number of transmission TEGs, an association between the transmission TEGs, and SRS transmission. The SRS transmission includes at least one of a SRS resource set, a SRS resource, or a SRS port. The process 1200 includes receiving UE capability including at least one of: (1) an indication of whether the wireless communication device supports a SRS resource configured for performing configured usage and for determining UE Rx-Tx time difference measurement; (2) an indication of whether a pair of reception TEG and transmission TEG is assumed as a combination; and (3) at least one pair of reception TEG and transmission TEG that can be assumed as a combination (1204). The process 1200 includes communicating using the transmission TEG information (1206).

FIG. 13 illustrates a flow chart of an example wireless communication process 1300, according to some embodiments. The process 1300 is performed by the UE. The process 1300 includes determining, by a wireless communication device, transmission TEG information of the wireless communication device according to at least one of usage of SRS transmission, UE antenna coherent capability, UE antenna switching capability, or SRS port (1302). The transmission TEG information includes at least one of a number of transmission TEGs, an association between the transmission TEGs and SRS transmission. The SRS transmission includes at least one of a SRS resource set, a SRS resource, or a SRS port. The process 1300 includes determining, by the wireless communication device, that the transmission TEG information is associated with at least one SRS resource or at least one SRS port, based on UE antenna switching capability (1304). The process 1300 includes communicating, by the wireless communication device with a network, using the transmission TEG information (1306).

While various embodiments of the present solution have been described above, it should be understood that they have been presented by way of example only, and not by way of limitation. Likewise, the various diagrams may depict an example architectural or configuration, which are provided to enable persons of ordinary skill in the art to understand example features and functions of the present solution. Such persons would understand, however, that the solution is not restricted to the illustrated example architectures or configurations, but can be implemented using a variety of alternative architectures and configurations. Additionally, as would be understood by persons of ordinary skill in the art, one or more features of one embodiment can be combined with one or more features of another embodiment described herein. Thus, the breadth and scope of the present disclosure should not be limited by any of the above-described illustrative embodiments.

It is also understood that any reference to an element herein using a designation such as "first," "second," and so forth does not generally limit the quantity or order of those elements. Rather, these designations can be used herein as a convenient means of distinguishing between two or more elements or instances of an element. Thus, a reference to first and second elements does not mean that only two elements can be employed, or that the first element must precede the second element in some manner.

Additionally, a person having ordinary skill in the art would understand that information and signals can be represented using any of a variety of different technologies and techniques. For example, data, instructions, commands, information, signals, bits and symbols, for example, which may be referenced in the above description can be represented by voltages, currents, electromagnetic waves, magnetic fields or particles, optical fields or particles, or any combination thereof.

A person of ordinary skill in the art would further appreciate that any of the various illustrative logical blocks, modules, processors, means, circuits, methods and functions described in connection with the aspects disclosed herein can be implemented by electronic hardware (e.g., a digital implementation, an analog implementation, or a combination of the two), firmware, various forms of program or design code incorporating instructions (which can be referred to herein, for convenience, as "software" or a "software module), or any combination of these techniques. To clearly illustrate this interchangeability of hardware, firmware and software, various illustrative components, blocks, modules, circuits, and steps have been described above generally in terms of their functionality. Whether such functionality is implemented as hardware, firmware or software, or a combination of these techniques, depends upon the particular application and design constraints imposed on the overall system. Skilled artisans can implement the described functionality in various ways for each particular application, but such implementation decisions do not cause a departure from the scope of the present disclosure.

Furthermore, a person of ordinary skill in the art would understand that various illustrative logical blocks, modules, devices, components and circuits described herein can be implemented within or performed by an integrated circuit (IC) that can include a general purpose processor, a digital signal processor (DSP), an application specific integrated circuit (ASIC), a field programmable gate array (FPGA) or other programmable logic device, or any combination thereof. The logical blocks, modules, and circuits can further include antennas and/or transceivers to communicate with various components within the network or within the device. A general purpose processor can be a microprocessor, but in the alternative, the processor can be any conventional processor, controller, or state machine. A processor can also be implemented as a combination of computing devices, e.g., a combination of a DSP and a microprocessor, a plurality of microprocessors, one or more microprocessors in conjunction with a DSP core, or any other suitable configuration to perform the functions described herein.

If implemented in software, the functions can be stored as one or more instructions or code on a computer-readable medium. Thus, the steps of a method or algorithm disclosed herein can be implemented as software stored on a computer-readable medium. Computer-readable media includes both computer storage media and communication media including any medium that can be enabled to transfer a computer program or code from one place to another. A storage media can be any available media that can be accessed by a computer. By way of example, and not limitation, such computer-readable media can include RAM, ROM, EEPROM, CD-ROM or other optical disk storage, magnetic disk storage or other magnetic storage devices, or any other medium that can be used to store desired program code in the form of instructions or data structures and that can be accessed by a computer.

In this document, the term "module" as used herein, refers to software, firmware, hardware, and any combination of these elements for performing the associated functions described herein. Additionally, for purpose of discussion, the various modules are described as discrete modules. However, as would be apparent to one of ordinary skill in the art, two or more modules may be combined to form a single module that performs the associated functions according embodiments of the present solution.

Additionally, memory or other storage, as well as communication components, may be employed in embodiments of the present solution. It will be appreciated that, for clarity purposes, the above description has described embodiments of the present solution with reference to different functional units and processors. However, it will be apparent that any suitable distribution of functionality between different functional units, processing logic elements or domains may be used without detracting from the present solution. For example, functionality illustrated to be performed by separate processing logic elements, or controllers, may be performed by the same processing logic element, or controller. Hence, references to specific functional units are only references to a suitable means for providing the described functionality, rather than indicative of a strict logical or physical structure or organization.

Various modifications to the embodiments described in this disclosure will be readily apparent to those skilled in the art, and the general principles defined herein can be applied to other embodiments without departing from the scope of this disclosure. Thus, the disclosure is not intended to be limited to the embodiments shown herein, but is to be accorded the widest scope consistent with the novel features and principles disclosed herein, as recited in the claims below.

What is claimed is:

1. A wireless communication method, comprising:
   determining, by a wireless communication device, transmission Timing Error Group (TEG) information of the wireless communication device according to at least one of usage of a Sounding Reference Signal (SRS) transmission, User Equipment (UE) antenna coherent capability, UE antenna switching capability, or SRS port, wherein
   the transmission TEG information comprises at least one of a number of transmission TEGs or an association between the transmission TEGs and the SRS transmission;
   the SRS transmission comprises at least one of a SRS resource set, a SRS resource, or a SRS port;
   communicating, by the wireless communication device with a network, using the transmission TEG information; and
   sending, by the wireless communication device to the network, UE capability, wherein the UE capability comprises at least one of:
      an indication of whether the wireless communication device supports a SRS resource configured for performing configured usage and for determining UE Rx-Tx time difference measurement;
      an indication of whether a pair of reception TEG and transmission TEG is assumed as a combination;
      at least one pair of reception TEG and transmission TEG that can be assumed as a combination.

2. The wireless communication method of claim 1, further comprising receiving, by the wireless communication device from the network, a configuration of the SRS transmission, wherein the configuration of SRS transmission comprises the transmission TEG information.

3. The wireless communication method of claim 1, further comprising sending, by the wireless communication device to the network, UE capability, wherein the UE capability comprises the transmission TEG information.

4. A computer program product comprising a computer-readable program medium code stored thereupon, the code, when executed by at least one processor, causing the at least one processor to implement the method recited in claim 1.

5. A wireless communication method, comprising:
   determining, by a wireless communication device, transmission Timing Error Group (TEG) information of the wireless communication device according to at least one of usage of a Sounding Reference Signal (SRS) transmission, User Equipment (UE) antenna coherent capability, UE antenna switching capability, or SRS port, wherein
      the transmission TEG information comprises at least one of a number of transmission TEGs or an association between the transmission TEGs and the SRS transmission;
      the SRS transmission comprises at least one of a SRS resource set, a SRS resource, or a SRS port; and
   communicating, by the wireless communication device with a network, using the transmission TEG information,
   wherein:
      the usage of the SRS transmission corresponds to the SRS transmission being configured with codebook usage; and
      the transmission TEG information is associated with at least one SRS port.

6. The wireless communication method of claim 5, wherein one of:
   the UE antenna coherent capability is non-coherent, and a number of transmission TEGs supported by the wireless communication device is at most a first number;
   the UE antenna coherent capability is partial-coherent, and the number of transmission TEGs supported by the wireless communication device is at most a second number;
   the UE antenna coherent capability is full-coherent, and the number of transmission TEGs supported by the wireless communication device is at most a third number; or
   the number of transmission TEGs supported by the wireless communication device is the fourth number, an association between the SRS port and the transmission TEG being predefined.

7. A wireless communication method, comprising:
   determining, by a wireless communication device, transmission Timing Error Group (TEG) information of the wireless communication device according to at least one of usage of a Sounding Reference Signal (SRS) transmission, User Equipment (UE) antenna coherent capability, UE antenna switching capability, or SRS port, wherein
      the transmission TEG information comprises at least one of a number of transmission TEGs or an association between the transmission TEGs and the SRS transmission;
      the SRS transmission comprises at least one of a SRS resource set, a SRS resource, or a SRS port; and
   communicating, by the wireless communication device with a network, using the transmission TEG information,
   wherein:
      the usage of the SRS transmission corresponds to the SRS transmission being configured with non-codebook usage; and
      the transmission TEG information is associated with at least one SRS port, or one SRS resource.

8. A wireless communication method, comprising:
   determining, by a wireless communication device, transmission Timing Error Group (TEG) information of the wireless communication device according to at least one of usage of a Sounding Reference Signal (SRS) transmission, User Equipment (UE) antenna coherent capability, UE antenna switching capability, or SRS port, wherein
      the transmission TEG information comprises at least one of a number of transmission TEGs or an association between the transmission TEGs and the SRS transmission;
      the SRS transmission comprises at least one of a SRS resource set, a SRS resource, or a SRS port; and
   communicating, by the wireless communication device with a network, using the transmission TEG information,
   wherein:
      the usage of the SRS transmission corresponds to the SRS transmission being configured with beam management; and
      the transmission TEG information is associated with at least one SRS port, or one SRS resource, or one SRS resource set.

9. A wireless communication method, comprising:
   determining, by a wireless communication device, transmission Timing Error Group (TEG) information of the wireless communication device according to at least one of usage of a Sounding Reference Signal (SRS) transmission, User Equipment (UE) antenna coherent capability, UE antenna switching capability, or SRS port, wherein
      the transmission TEG information comprises at least one of a number of transmission TEGs or an association between the transmission TEGs and the SRS transmission;
      the SRS transmission comprises at least one of a SRS resource set, a SRS resource, or a SRS port; and
   communicating, by the wireless communication device with a network, using the transmission TEG information,
   wherein:
      the usage of the SRS transmission corresponds to the SRS transmission being configured with antenna switching; and
      the wireless communication method further comprises determining, by the wireless communication device, that the transmission TEG information is associated with at least one SRS resource or at least one SRS port, based on the UE antenna switching capability.

10. The wireless communication method of claim 9, wherein one of:
   the UE antenna switching capability corresponds to one of 1T1R, 1T2R, 1T4R, 1T6R, or 1T8R, and the transmission TEG information is associated with the at least one SRS resource;

the UE antenna switching capability corresponds to 2T2R, or 4T4R, and the transmission TEG information is associated with the at least one SRS port; or the UE antenna switching capability corresponds to one of 2T4R, 2T6R, 2T8R, or 4T8R, and the transmission TEG information is associated with the at least one SRS resource or the at least one SRS port.

11. A wireless communication method, comprising:
determining, by a wireless communication device, transmission Timing Error Group (TEG) information of the wireless communication device according to at least one of usage of a Sounding Reference Signal (SRS) transmission, User Equipment (UE) antenna coherent capability, UE antenna switching capability, or SRS port, wherein
  the transmission TEG information comprises at least one of a number of transmission TEGs or an association between the transmission TEGs and the SRS transmission;
  the SRS transmission comprises at least one of a SRS resource set, a SRS resource, or a SRS port; and
communicating, by the wireless communication device with a network, using the transmission TEG information;
reporting, by the wireless communication device to the network, UE capability, wherein the UE capability comprises an indication of whether the wireless communication device supports a SRS resource configured for performing configured usage and for determining UE Rx-Tx time difference measurement.

12. The wireless communication method of claim 11, wherein the SRS resource is configured with a label indicating whether the SRS resource is capable of being used for the configured usage and for determining the UE Rx-Tx time difference measurement in positioning.

13. A wireless communication method, comprising:
determining, by a wireless communication device, transmission Timing Error Group (TEG) information of the wireless communication device according to at least one of usage of a Sounding Reference Signal (SRS) transmission, User Equipment (UE) antenna coherent capability, UE antenna switching capability, or SRS port, wherein
  the transmission TEG information comprises at least one of a number of transmission TEGs or an association between the transmission TEGs and the SRS transmission;
  the SRS transmission comprises at least one of a SRS resource set, a SRS resource, or a SRS port; and
communicating, by the wireless communication device with a network, using the transmission TEG information;
reporting, by the wireless communication device to the network, UE capability, wherein the UE capability comprises an indication of whether a pair of reception TEG and transmission TEG is assumed as a combination.

14. A wireless communication method, comprising:
determining, by a wireless communication device, transmission Timing Error Group TEG) information of the wireless communication device according to at least one of usage of a Sounding Reference Signal (SRS) transmission, User Equipment (UE) antenna coherent capability, UE antenna switching capability, or SRS port, wherein
  the transmission TEG information comprises at least one of a number of transmission TEGs or an association between the transmission TEGs and the SRS transmission;
  the SRS transmission comprises at least one of a SRS resource set, a SRS resource, or a SRS port; and
communicating, by the wireless communication device with a network, using the transmission TEG information;
reporting, by the wireless communication device to the network, UE capability, wherein the UE capability comprises at least one pair of reception TEG and transmission TEG that can be assumed as a combination.

15. A wireless communication device, comprising:
at least one processor configured to:
  determine transmission Timing Error Group (TEG) information of the wireless communication device according to at least one of usage of Sounding Reference Signal (SRS) transmission, User Equipment (UE) antenna coherent capability, UE antenna switching capability, or SRS port, wherein
    the transmission TEG information comprises at least one of a number of transmission TEGs or an association between the transmission TEGs and SRS transmission;
    the SRS transmission comprises at least one of a SRS resource set, a SRS resource, or a SRS port;
  communicate, via a transceiver with a network, using the transmission TEG information; and
  send, via the transceiver to the network, UE capability, wherein the UE capability comprises at least one of:
    an indication of whether the wireless communication device supports a SRS resource configured for performing configured usage and for determining UE Rx-Tx time difference measurement;
    an indication of whether a pair of reception TEG and transmission TEG is assumed as a combination;
  at least one pair of reception TEG and transmission TEG that can be assumed as a combination.

16. A wireless communication method, comprising:
determining, by a network, transmission Timing Error Group (TEG) information of a wireless communication device, the transmission TEG information is determined based on at least one of usage of Sounding Reference Signal (SRS) transmission, User Equipment (UE) antenna coherent capability, UE antenna switching capability, or SRS port, wherein
  the transmission TEG information comprises at least one of a number of transmission TEGs, an association between the transmission TEGs or SRS transmission;
  the SRS transmission comprises at least one of a SRS resource set, a SRS resource, or a SRS port;
communicating, by the network with the wireless communication device, using the transmission TEG information; and
receiving, by the network from the wireless communication device, UE capability, wherein the UE capability comprises at least one of:
  an indication of whether the wireless communication device supports a SRS resource configured for performing configured usage and for determining UE Rx-Tx time difference measurement;
  an indication of whether a pair of reception TEG and transmission TEG is assumed as a combination;

at least one pair of reception TEG and transmission TEG that can be assumed as a combination.

17. The wireless communication method of claim 16, further comprising sending, by the network to the wireless communication device, configuration of the SRS transmission, wherein the configuration of SRS transmission comprises the transmission TEG information.

18. The wireless communication method of claim 16, wherein determining the transmission TEG information of the wireless communication device comprises receiving, by the network from the wireless communication device, the UE capability, wherein the UE capability comprises the transmission TEG information, wherein the transmission TEG information is determined by the wireless communication device according to the at least one of the usage of the SRS transmission, the UE antenna coherent capability, the UE antenna switching capability, or the SRS port.

19. A network node, comprising:
  at least one processor configured to:
    determine transmission Timing Error Group (TEG) information of a wireless communication device, the transmission TEG information is determined based on at least one of usage of Sounding Reference Signal (SRS) transmission, User Equipment (UE) antenna coherent capability, UE antenna switching capability, or SRS port, wherein
    the transmission TEG information comprises at least one of a number of transmission TEGs, an association between the transmission TEGs or SRS transmission;
    the SRS transmission comprises at least one of a SRS resource set, a SRS resource, or a SRS port; and
  communicate, via a transceiver with the wireless communication device, using the transmission TEG information; and
  receive, by the transceiver from the wireless communication device, UE capability, wherein the UE capability comprises at least one of:
    an indication of whether the wireless communication device supports a SRS resource configured for performing configured usage and for determining UE Rx-Tx time difference measurement;
    an indication of whether a pair of reception TEG and transmission TEG is assumed as a combination;
    at least one pair of reception TEG and transmission TEG that can be assumed as a combination.

\* \* \* \* \*